United States Patent [19]

Titus et al.

[11] 4,424,547

[45] Jan. 3, 1984

[54] SURGE SUPPRESSOR CONSTRUCTION

[75] Inventors: Charles H. Titus, Newtown Square, Pa.; John E. Zlupko, Marlton, N.J.

[73] Assignee: General Electric Company, King of Prussia, Pa.

[21] Appl. No.: 341,711

[22] Filed: Jan. 22, 1982

Related U.S. Application Data

[63] Continuation of Ser. No. 203,837, Nov. 4, 1980, abandoned.

[51] Int. Cl.[3] .......... H02H 9/04

[52] U.S. Cl. .......... 361/127; 361/126; 315/36

[58] Field of Search .......... 361/127, 126, 128, 130, 361/117, 120; 315/36; 313/231.1

[56] References Cited

U.S. PATENT DOCUMENTS

| | | | |
|---|---|---|---|
| 3,467,936 | 9/1969 | Nasser | 361/127 X |
| 3,805,114 | 4/1974 | Matsuoka et al. | 361/128 |
| 3,928,245 | 12/1975 | Fishman et al. | 338/21 X |
| 3,959,543 | 5/1976 | Ellis | 361/126 X |
| 4,223,366 | 9/1980 | Sweetana et al. | 361/127 |
| 4,262,318 | 4/1981 | Shirakawa et al. | 361/127 |

FOREIGN PATENT DOCUMENTS

| | | | |
|---|---|---|---|
| 54-113054 | 9/1979 | Japan | 315/36 |

*Primary Examiner*—Patrick R. Salce
*Attorney, Agent, or Firm*—William Freedman

[57] ABSTRACT

This surge suppressor comprises a tubular insulating housing having a metal end cap at one end and an integral end wall at its opposite end. A metal terminal extends through the end wall and has a portion within the housing. A stack of metal-oxide varistor blocks has one end bearing against said terminal portion and an external periphery spaced from the surrounding wall of the housing. A metal plate at the other end of the stack is urged against said other end of the stack by a spring between the end cap and the plate. A plurality of ceramic rods fixed to the end wall extend alongside said stack and through holes in the end plate and serve to limit such lateral motion of the stack as produced by vibrations and mechanical shocks.

6 Claims, 5 Drawing Figures

SURGE SUPPRESSOR CONSTRUCTION

This is a continuation, of application Ser. No. 203,837, filed Nov. 4, 1980; now abandoned.

BACKGROUND

This invention relates to a surge suppressor for limiting the magnitude of the surge voltages appearing between two points in an electric power system at widely different potentials. More particularly, the invention relates to a surge suppressor of this type which includes a stack of metal-oxide varistor blocks that have non-linear voltage-current characteristics and an insulating housing in which said stack is located.

This surge suppressor is adapted to be installed in metal-clad switchgear to limit the overvoltages produced by operation of the circuit breaker forming a part of the switchgear. Heretofore, it was customary to use for such a surge suppressor a device capable of functioning normally as a lightning arrestor. The duties imposed upon a lightning arrestor are much more severe than those normally imposed upon a surge suppressor. Since the usual lightning arrestor is designed to meet these very severe duties, it tends to be excessively expensive, bulky, and heavy when used as a surge suppressor for metal-clad switchgear.

SUMMARY

An object of our invention is to provide a simple surge suppressor which is substantially less expensive and substantially lighter in weight than the usual lightning arrestor of similar voltage rating.

Another object is to provide a surge suppressor which can accommodate different size metal-oxide varistor blocks without requiring major changes in the other components of the suppressor.

Still another object is to provide a simple, lightweight surge suppressor which can readily meet industry standards for resistance to damage from earthquakes and other types of mechanical vibrations while at the same time provide the required voltage limiting characteristics when subjected to voltage surges.

In carrying out the invention in one form, we provide a surge suppressor that comprises a tubular housing of insulating material having one end open and an end wall at its opposite end, a metal end cap sealingly joined to said one end of the housing, and a metal terminal at the other end of the housing extending through the end wall and having a portion located within the housing. The suppressor further comprises a stack of metal-oxide varistor blocks located within the housing and having two opposed ends. One end of the stack bears against said terminal portion and the other end of the stack is engaged by a metal plate that is axially movable within the housing. A spring located between the end cap and the metal plate urges the metal plate into engagement with said other end of the stack. A plurality of rods of insulating material fixed to the end wall extend through openings in the metal plate registering with the rods. The rods extend alongside said stack through a cylindrical space between the stack and the housing and serve to prevent excessive lateral motion of the stack in response to vibrations or mechanical shock.

BRIEF DESCRIPTION OF DRAWINGS

FIG. 1 is taken along the line 1—1 of FIG. 2.

DETAILED DESCRIPTION OF PREFERRED EMBODIMENT

Figure 1:
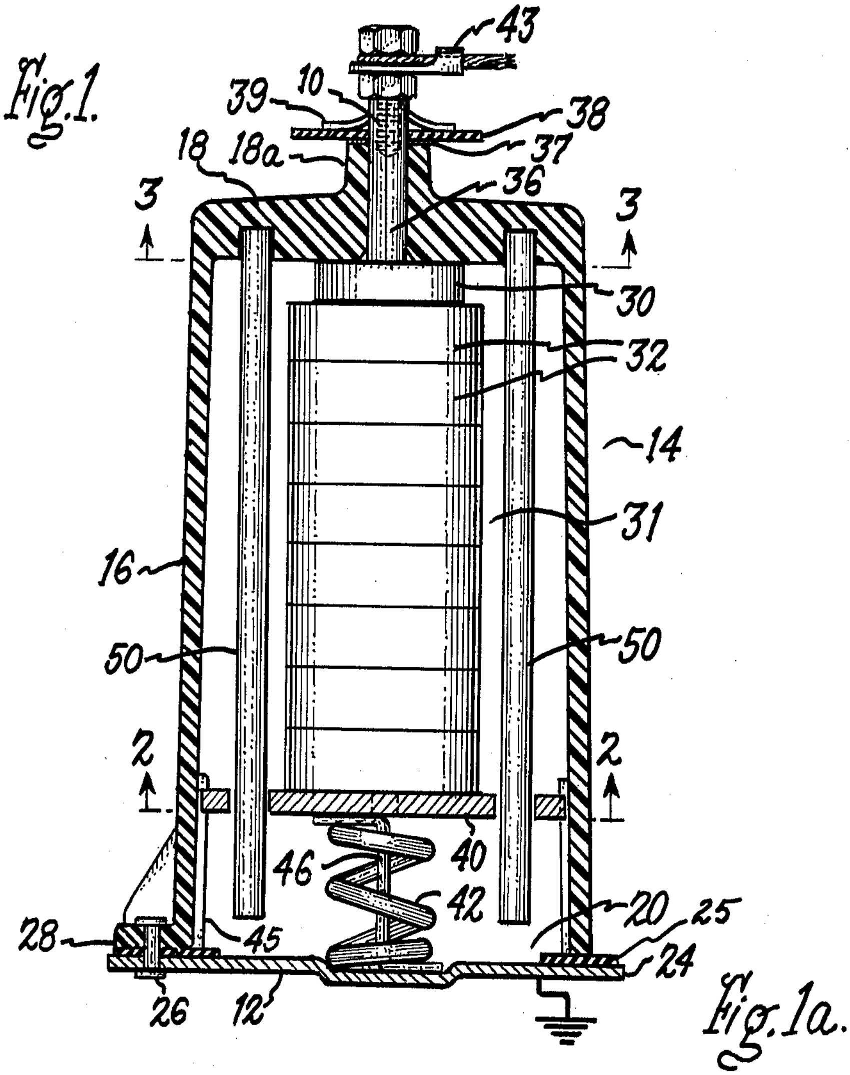
FIG. 1 is a cross-sectional view through a surge suppressor embodying one form of the present invention.

Referring now to FIG. 1, the illustrated surge suppressor comprises a pair of spaced-apart terminals 10 and 12 which are normally at widely-different potentials and between which it is desired to limit the voltage to a predetermined value despite the occurrence of voltage surges. The surge suppressor comprises a housing 14 of a suitable insulating material such as a track-resistant polyester resin reinforced with glass fibers. Housing 14 is of a generally tubular form and comprises a tubular wall portion 16 having two opposed ends. At one end, there is an integrally-formed end wall 18; and at the other end 20, the housing is open.

The open end of the housing is sealed by sealing means including a metal end plate 24 which extends across the open end. A sealing gasket 25 is located between the end plate 24 and the end of the housing, and a plurality of rivets 26 of insulating material secure the end plate to the housing and compress the gasket between the housing and the end plate. The housing 10 has a plurality of radially-extending lugs 28 angularly spaced about its periphery and containing holes registering with holes in the end plate through which the rivets 26 extend.

Figure 1A:
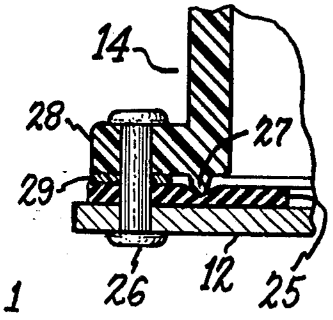
FIG. 1*a* is an enlarged view of a portion of FIG. 1.
Figure 2:
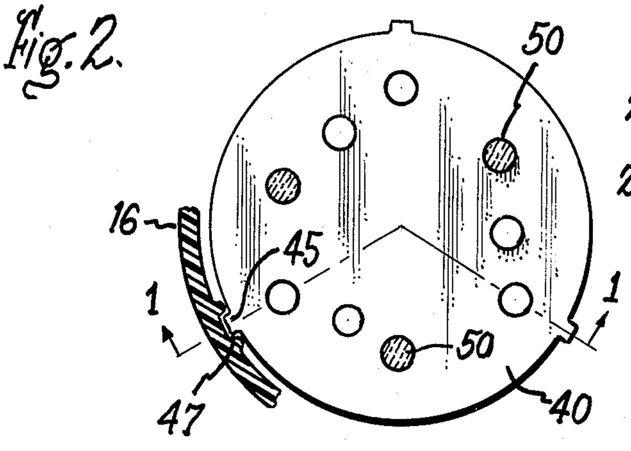
FIG. 2 is a sectional view taken along the line 2—2 of FIG. 1.

As shown in FIG. 1*a,* the housing 14 has a downwardly-projecting lip 27 that forms a sealing surface of restricted area for contacting and forming a good seal with the gasket 25. This lip 27 extends about the entire circumference of the lower end of the tubular housing 14. A stop 29 integral with lug 28 limits the extent to which the rivet 26 compresses the gasket. At the upper end of the housing 14, the end wall 18 includes an upwardly-projecting boss 18*a* having a central bore of hexagonal cross-section. The upper terminal 10 comprises a shaft portion 36 of hexagonal cross-section which extends through the end wall 18, fitting snugly within the hexagonal bore of the boss 18*a,* thus precluding rotation of the terminal 10 with respect to the boss. A thin layer 37 of elastomeric sealant such as RTV silicone surrounds the shaft portion 36 at the upper face of the boss 18*a* and forms a seal between the shaft portion and the boss.

Atop the boss 18*a* is a thin disc 38 of insulating material which is bonded to the upper face of the boss through the elastomeric layer 37. This thin disc 38 serves to provide added creep distance externally of the housing 14 between its upper terminal 10 and its lower terminal 24. The elastomeric layer 37 forms a good bond between disc 38 and the upper face of the boss over the entire upper face, thereby eliminating any electrical creepage path between the disc 38 and the upper face of the boss. A self-locking sheet metal washer 39 surrounds and frictionally engages the shaft portion 36 and also bears against the upper surface of the insulating disc 38 to restrain the terminal 10 against downward motion relative to boss 18a and to prevent upward motion of disc 38 relative to boss 18a. A conductor 43 is suitably attached to the upper terminal to connect the suppressor into an associated power circuit.

At its lower end, the upper terminal 10 has its enlarged metal disc portion 30 located within the housing 14. Also located within housing 14 is a stack 31 of metal oxide varistor blocks 32. Each of these blocks 32 has two planar end faces and a cylindrical periphery extending between these faces. The cylindrical peripheries are disposed in substantially aligned relationship. The end faces of each block 32 are coated with highly conductive metal such as silver or flame-sprayed aluminum so as to distribute the current flowing through each block across its end face and so as to provide for a good electrical connection to an adjacent block or terminal structure.

The specific composition of these blocks forms no part of our invention. A suitable composition for these blocks is the primarily zinc-oxide composition disclosed and claimed in U.S. Pat. No. 3,928,245—Fishman et al., assigned to the assignee of the present invention. Such material has non-linear voltage-current characteristics that enable it to limit voltage surges to the desired level and to return to its substantially non-conducting normal state when the voltage falls below this level. In one form of the invention, a thin coating of a ceramic material such as mullite is present on the outer periphery of each block.

For holding the blocks 32 together and for pressing the upper end surface of the stack 31 against the terminal portion 30, a metal end plate 40 and a compression spring 42 are provided. The compression spring 42 is located between the end cap 12 and the end plate 40 and biases the end plate 40 upwardly into engagement with the bottom end face of the stack 31. The upward force supplied by spring 42 also forces the stack 31 upwardly into engagement with terminal portion 30. A flexible conductor 46 extends through the window of spring 42 and serves to carry current between the end plate 12 and the end cap 40. The two ends of conductor 46 are pressed by the spring 42 into high-pressure contact with the parts 12 and 40, respectively, thus providing good electrical connections between the ends of the conductor and the parts 12 and 40.

Under certain conditions of vibration and mechanical shock, such as those produced by earthquakes and those produced by transportation of the surge suppressor, the blocks 32 are subjected to forces tending to displace them laterally from their illustrated position. To constrain the blocks against such lateral motion, we provide a plurality of vertically-extending rods 50 in the cylindrical space between the stack 31 and the surrounding tubular wall 16 of the housing 14. These rods 50 are angularly spaced at equal intervals around the periphery of the stack and are fixed at their upper ends to the end wall 18 of the housing 14. In one form of the invention, the rods 50 fit snugly into recesses provided for this purpose in the end wall 18, where they are bonded by a suitable adhesive surrounding each rod. The rods extend alongside the stack 31 for its full length and then through closely-surrounding holes in the end plate 40 registering with the rods. As will soon be explained, the end plate 40 is restrained from rotating about the central axis of housing 14 and thus is able to restrain the lower end of the rods against possibly damaging motion.

The rods 50 can be made of any suitable insulating material which is compatible with the blocks 32. More specifically, the rod material should be such that the touching or rubbing of a rod by a block 32 will not degrade the electrical characteristics of the block or the rod. In one form of the invention, rods 50 are of a suitable ceramic. A ceramic material is especially desirable for the rods 50 since it is non-conductive, has good insulating properties which are substantially unaffected by elevated temperatures and by any corona on the adjacent stack, and is not susceptible to creep tracking.

For restraining rotational motion of the end plate 40, the end plate is provided with a plurality of radially-outward projecting ears 45 which fit within grooves 46 in the housing 14. These grooves allow the end plate 40 to move vertically or along the central axis of the housing 14, but prevent rotation about this axis. Vertical motion of the end plate occurs when the suppressor is being assembled or disassembled.

Figure 3:
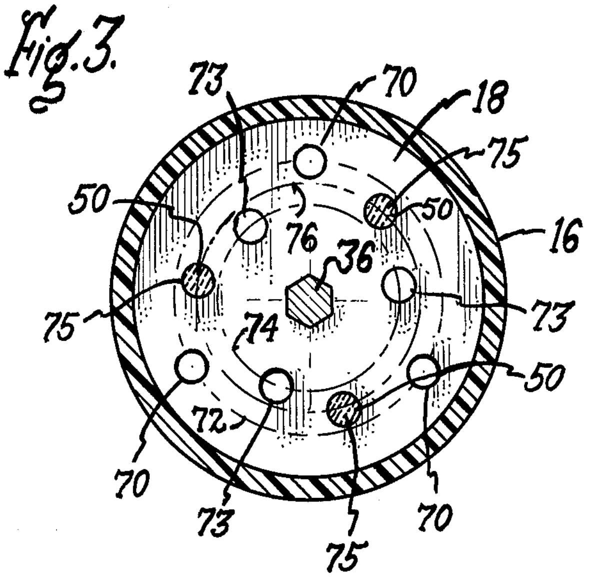
FIG. 3 is a sectional view taken along the line 3—3 of FIG. 1.

It is highly desirable that the illustrated surge suppressor design be capable of accommodating metal oxide blocks of different diameters from the diameter illustrated in FIG. 1 without requiring major changes in the other components of the suppressor. To impart this capability to the suppressor design, we have provided the upper end wall with a plurality of alternate sets of recesses into which the rods 50 can be fitted and, in addition, have provided the end plate 40 with a registering plurality of holes for accommodating the rods 50. As shown in FIG. 3, one set of recesses 70 in the upper end wall 18 is provided on a relatively large reference circle 72; a second set 73 on a relatively small reference circle 74, and a third set 75 on a reference circle 76 of intermediate diameter. The rods 50 are shown positioned in recesses 75 to accommodate blocks 32 of an intermediate diameter. But if the rods are positioned in recesses 70, they will accommodate blocks of larger diameter and if positioned in recesses 73, will accommodate blocks of reduced diameter. The holes in the end plate 40 are so positioned that irrespective of the set of recesses used, there will be registering holes in the end plate to accommodate the rods.

In a preferred embodiment of the invention, we fill the small annular gap between each of the rods 50 and its surrounding hole in the end plate 40 with elastomeric compound, such as RTV silicone, to more effectively restrain the rods against lateral motion in the holes, particularly during vibrations in a lateral mode.

As pointed out hereinabove, there is a tendency of the entire stack of varistor blocks 32 to move sideways under certain vibration and mechnical shock conditions; and the rods 50 prevent extreme lateral excursions of the stack under these conditions. To further restrain such lateral motion, the lower face of the metal disc portion 30 and upper face of the end plate 40 are roughened in the areas where they contact the stack of varistor blocks 32. The metal coatings on the varistor blocks are also roughened. The roughness of these mating surfaces cooperates with the spring forces urging these surfaces together to increase the friction present in these regions, thus increasing the resistance of the stack to lateral motion.

Figure 4:
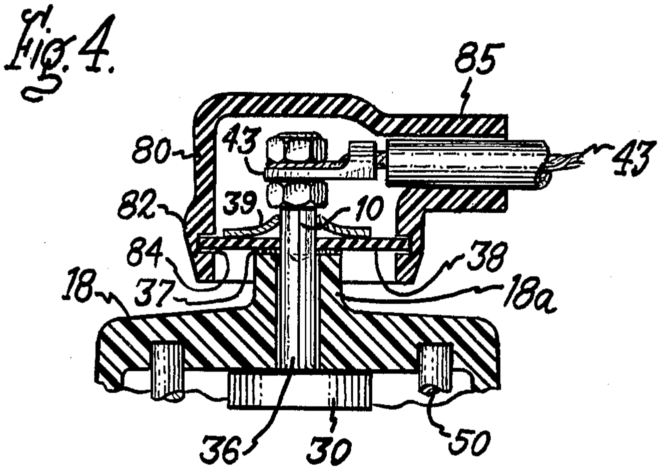
FIG. 4 is an enlarged sectional view of the upper terminal portion of FIG. 1 and showing a protective end cap in place.

FIG. 4 is an enlarged view of the upper terminal structure 10 and certain adjacent parts including a protective cap so placed over the external portion of the terminal structure to protect it from mechanical damage and to exclude moisture and contaminants from this region. The cap 80 is of elastomeric insulating material and includes a cylindrical portion 82 having an annular groove 84 in its internal wall. This groove 84 is adapted to receive snugly the outer periphery of the disc 38, thus providing a good seal between the cylindrical wall portion 82 and the disc 38. The conductor 43 extends through a closely-surrounding hollow boss 85 provided in the side wall of the cap 80. Little or no clearance is provided between the passage through the boss and the conductor 43, thus inhibiting the entry of moisture and contaminants along the conductor.

The exclusion of moisture and contaminants from this region allows the insulating disc 38 to remain clean so that it can effectively serve one of its desired functions of increasing the length of the external creepage path between the upper terminal 10 and lower terminal 12. In addition, the cap 80 serves to reduce the chance of moisture entering the surge suppressor along the shaft portion 12 of the upper terminal 10.

Although we have shown the illustrated stack 31 as comprising eight metal-oxide blocks it is to be understood that this number can readily be changed as system requirements dictate, for example, by using one or more metal spacer blocks in place of some of the metal-oxide blocks 32.

Another point to be noted is that the compression spring 42 acts through the stack 31 to hold the upper terminal 10 in place within the upper end wall 18.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new is:

1. A surge suppressor for limiting the magnitude of the surge voltages appearing between two points in an electric power system at widely different potentials, comprising:

(a) a tubular housing of insulating material having one end open and an end wall of insulating material at its opposite end, (b) a metal end cap sealingly joined to said one end of the housing, (c) a metal terminal at the other end of said housing extending through said end wall and having a portion located within said housing, (d) a stack of metal-oxide varistor blocks within said housing having two opposed ends, one of which bears against said portion of said terminal, said stack having an external diameter much smaller than the internal diameter of said tubular housing so that a generally cylindrical space is present between said stack and the surrounding wall of said housing, (e) a metal plate bearing against the other end of said stack of blocks, (f) a spring located between said metal end cap and said metal plate and urging said plate into engagement with said other end of said stack, (g) a plurality of rods of insulating material fixed to said end wall independently of said terminal and extending through openings in said metal plate registering with said rods, said rods extending alongside said stack through said cylindrical space and limiting lateral movement of said stack in response to vibrations and mechanical shock, (h) and means at the outer periphery of said metal plate engaging said housing for blocking rotation of said metal plate about the central axis of said tubular housing but allowing axial motion of said plate relative to said housing.

2. The surge suppressor of claim 1 in which said end wall includes a plurality of recesses for snugly receiving said rods.

3. The surge suppressor of claim 1 in which said end wall includes a first plurality of recesses for snugly receiving said rods so as to locate the rods at a first predetermined distance from the central axis of said housing and a second plurality of recesses for receiving similar rods so as to adapt the housing for location of said similar rods at a second predetermined distance from said central axis.

4. The surge suppressor of claim 3 in which said metal plate includes additional openings adapted to receive said similar rods when they are located in said second plurality of recesses.

5. The surge suppressor of claim 1 in which:

(a) said metal terminal comprises a shaft portion extending through said end wall, (b) a thin annular disc of insulating material surrounds said shaft portion in a location externally of said end wall, (c) a layer of insulating material is disposed between and is bonded to said disc and said end wall, and (d) said disc projects radially outwardly of the immediately adjacent portion of said end wall so as to provide additional length in the electrical creepage path externally of said tubular housing between its ends.

6. The surge suppressor of claim 5 in which:

(a) a conductor is connected to said terminal at the outer end of the terminal, (b) a protective cap of elastomeric material surrounds the outer end of the terminal and the immediately adjacent region of the conductor, and (c) said protective cap has a cylindrical wall portion containing an annular internal groove which snugly receives the outer periphery of said disc.

* * * * *